(12) United States Patent
Huang et al.

(10) Patent No.: US 7,258,757 B2
(45) Date of Patent: Aug. 21, 2007

(54) METHOD OF MANUFACTURING AN IMPACT RESISTANT AND INSULATED GLASS UNIT COMPOSITE WITH SOLAR CONTROL AND LOW-E COATINGS

(75) Inventors: Haibin Huang, Tampa, FL (US); Craig Duncan, Hudson, FL (US)

(73) Assignee: Film Technologies International, Inc., St. Petersburg, FL (US)

( * ) Notice: Subject to any disclaimer, the term of this patent is extended or adjusted under 35 U.S.C. 154(b) by 451 days.

(21) Appl. No.: 10/975,512

(22) Filed: Oct. 28, 2004

(65) Prior Publication Data

US 2006/0090834 A1    May 4, 2006

(51) Int. Cl.
*E06B 3/66* (2006.01)

(52) U.S. Cl. .......................... 156/109; 156/107

(58) Field of Classification Search .............. None
See application file for complete search history.

(56) References Cited

U.S. PATENT DOCUMENTS

| | | | |
|---|---|---|---|
| 3,537,944 A | 11/1970 | Grubb et al. | |
| 3,869,198 A | 3/1975 | Ballentine | |
| 4,047,351 A * | 9/1977 | Derner et al. | 52/786.13 |
| 4,565,719 A * | 1/1986 | Phillips et al. | 428/34 |
| 4,799,745 A | 1/1989 | Meyer et al. | |
| 4,963,206 A | 10/1990 | Shacklette et al. | |
| 4,997,687 A | 3/1991 | Carter | |
| 5,030,503 A | 7/1991 | Carter et al. | |
| 5,037,475 A | 8/1991 | Chida et al. | |
| 5,071,206 A | 12/1991 | Hood et al. | |
| 5,156,894 A | 10/1992 | Hood et al. | |
| 5,234,711 A | 8/1993 | Kamen et al. | |
| 5,269,108 A * | 12/1993 | Fremaux | 52/302.1 |
| 5,320,893 A | 6/1994 | Floyd | |
| 5,332,888 A | 7/1994 | Tausch et al. | |
| 5,468,532 A | 11/1995 | Ho et al. | |

(Continued)

FOREIGN PATENT DOCUMENTS

EP    0 036 657    *    9/1981

(Continued)

OTHER PUBLICATIONS

Downloaded from http://www.pilkington.com/applications/products/the+americas/usa/english/bybenefit/thermal+insulatio . . . , Pilkington Solar-E - Solar Control Low E Glass - Overview, The world's first pyrolytic solar control Low-E glass.

*Primary Examiner*—Jessica Ward
(74) *Attorney, Agent, or Firm*—Christopher Paradies; Fowler White Boggs Banker P.A.

(57) ABSTRACT

A solar control coating is applied to a first glass pane interior surface and a low-E coating is applied to a second glass pane exterior surface. A safety film is applied over the coating on the interior surface of the first glass pane. The second glass pane has a low-E coating facing the interior of a room. A safety film is applied to the reverse side of the glass. The two glass panes are separated by a spacer and structural silicone is backfilled from each outboard end of the spacer to the coated inside surfaces of the first and second glass panes to form a two-glass pane composite.

16 Claims, 3 Drawing Sheets

U.S. PATENT DOCUMENTS

| | | |
|---|---|---|
| 5,585,427 A | 12/1996 | Schimmel et al. |
| 5,750,265 A | 5/1998 | Goodman |
| 5,897,957 A | 4/1999 | Goodman |
| 5,908,674 A * | 6/1999 | Schindler et al. ............. 428/34 |
| 6,030,671 A | 2/2000 | Yang et al. |
| 6,132,881 A * | 10/2000 | Hartig et al. ................ 428/432 |
| 6,218,018 B1 | 4/2001 | McKown et al. |
| 6,294,233 B1 | 9/2001 | Barth et al. |
| 6,333,084 B1 | 12/2001 | Woodard et al. |
| 6,391,400 B1 | 5/2002 | Russell et al. |
| 6,546,692 B1 | 4/2003 | Duncan et al. |
| 6,558,800 B1 | 5/2003 | Stachowiak |
| 6,632,491 B1 | 10/2003 | Thomsen et al. |
| 6,974,629 B1 * | 12/2005 | Krisko et al. ................ 428/432 |
| 2002/0021495 A1 * | 2/2002 | Lingle ........................ 359/585 |

FOREIGN PATENT DOCUMENTS

| | | | |
|---|---|---|---|
| GB | 2 012 668 | * | 8/1979 |
| WO | WO 2004/083585 | * | 9/2004 |

\* cited by examiner

METHOD OF MANUFACTURING AN IMPACT RESISTANT AND INSULATED GLASS UNIT COMPOSITE WITH SOLAR CONTROL AND LOW-E COATINGS

BACKGROUND OF THE INVENTION

1. Field of the Invention

The present invention relates to making insulated glass units used in residential, architectural and vehicle applications. More specifically, it refers to the manufacture of insulated glass (IG) units having coatings applied exhibiting solar control, low-E, and impact resistant properties.

2. Description of the Prior Art

Insulated glass windows or door units have been known for many years to reduce the heat transfer between the interior house and the environment. To further improve the insulating properties, the art taught making solar control coated and low-emissivity (low-E) coated glass or film.

Solar control is a term describing the property of regulating the amount of solar heat energy, which is allowed to pass through a glass article into an enclosed space such as a building or an automobile interior. Low emissivity is a term describing the property of an article's surface wherein the absorption and emission of mid-range infrared radiation is suppressed, making the surface a mid-range infrared reflector and thereby reducing heat flux through the article by attenuating the radiant component of heat transfer to and from the low emissivity surface. By suppressing solar heat gain, building and automobile interiors are kept cooler, allowing a reduction in air conditioning requirements and costs. Efficient low emissivity coatings improve comfort during both summer and winter by increasing the thermal insulating performance of a window.

Two typical coating methods to make solar control and low-E coatings are "in-line" and "off-line" coatings. The in-line method uses a chemical deposition method involving doping with different chemicals to make an infrared absorbing layer and low-E layer as described in U.S. Pat. Nos. 5,750,265, 5,897,957, and 6,218,018. The off-line method uses sputtering deposition to make both coatings.

Impact resistant glass is described in detail in the Florida Building Code. Basically, it specifies a testing protocol for a window glass to withstand up to nine pounds of force from a 2×4 board shot at the glass up to 50 feet/second. Withstanding both shots with one in the center and one in the corner without penetration, is considered as a pass.

U.S. Pat. Nos. 4,799,745 and 5,071,206 describe a multi-layered sputtering polyethyleneterephthalate (PET) window film construction, which gives both solar control and low-E properties. The coating-contains silver metal layers and indium-tin oxide layers in an alternate construction. The film has a high visible light transmission, above 70%, and a low visible light reflection, about 8%. The total solar heat rejection is about 56%. The color of the coating is light green. It has a very good solar control and low-E performances. However, corrosion is a major concern. To make an IG unit, it needs edge deletion and filling with inert gas in the IG unit to prevent the coating from corroding. The multi-layered coating has to be exposed within the IG unit to achieve both low-E and solar control functions. As a result, the manufacturing process becomes expensive.

U.S. Pat. Nos. 5,332,888 and 6,558,800 disclose a multi-layered sputtering window glass construction (off-line method), which also achieves both solar control and low-E properties. The former patent contains a silver metal layer sandwiched by zinc oxide layers and the latter contains a silver metal layer sandwiched by nickel chrome and silica nitrite layers. Similar to sputtered PET film, they also face corrosion, chemical resistant and scratch resistant concerns.

U.S. Pat. No. 6,546,692 assigned to Film Technologies International, Inc. discloses a method of laminating a safety film on the inside surfaces in an IG unit to build an impact resistant window. The safety feature is very important for window glass to withstand hurricane, earthquake, and terrorism. However, the low-E property would be destroyed or significantly weakened once a safety film is laminated over the low-E coating surface.

Besides solar control, low-E, and impact resistance, other desirable properties include an economic process, durability, maintenance, light transmission, visibility, color, clarity and reflection. These are important features during a window manufacturing process.

To meet the Government (Department of Energy) Energy Star Qualification Criteria for Windows, Doors and Skylights and Florida Building Code for impact resistant windows, a new window/door design is required for the window/door industry.

SUMMARY OF THE INVENTION

The present invention meets the Department of Energy criteria for windows, and has the important manufacturing features. First and second window panes are spaced apart by a spacer contacting an inside surface of each window pane. An inside surface of a first window pane is coated with a solar control and low-E coating, over which a safety film is laminated. An inside surface of a second window pane is laminated with a safety film. An outside surface of the second window pane is coated with a low-E coating (or both solar and low-E coating). This surface faces an interior of a room. It is preferred that this low-E coating be coated by the chemical vapor deposition method. Structural silicone is backfilled from each outboard end of the spacer to the coated inside surface of the first and second window pane to form a two window composite for use in window frames or door frames.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Throughout the following detailed description the same reference numbers refer to the same elements in all figures.

To meet solar control criteria, it would be ideal to coat a solar reflective coating on the exterior surface of a window pane. However, because of environmental aging, chemical reaction, corrosion or scratching caused by cleaning the window, the coating cannot be placed on the exterior surface.

Figure 1:
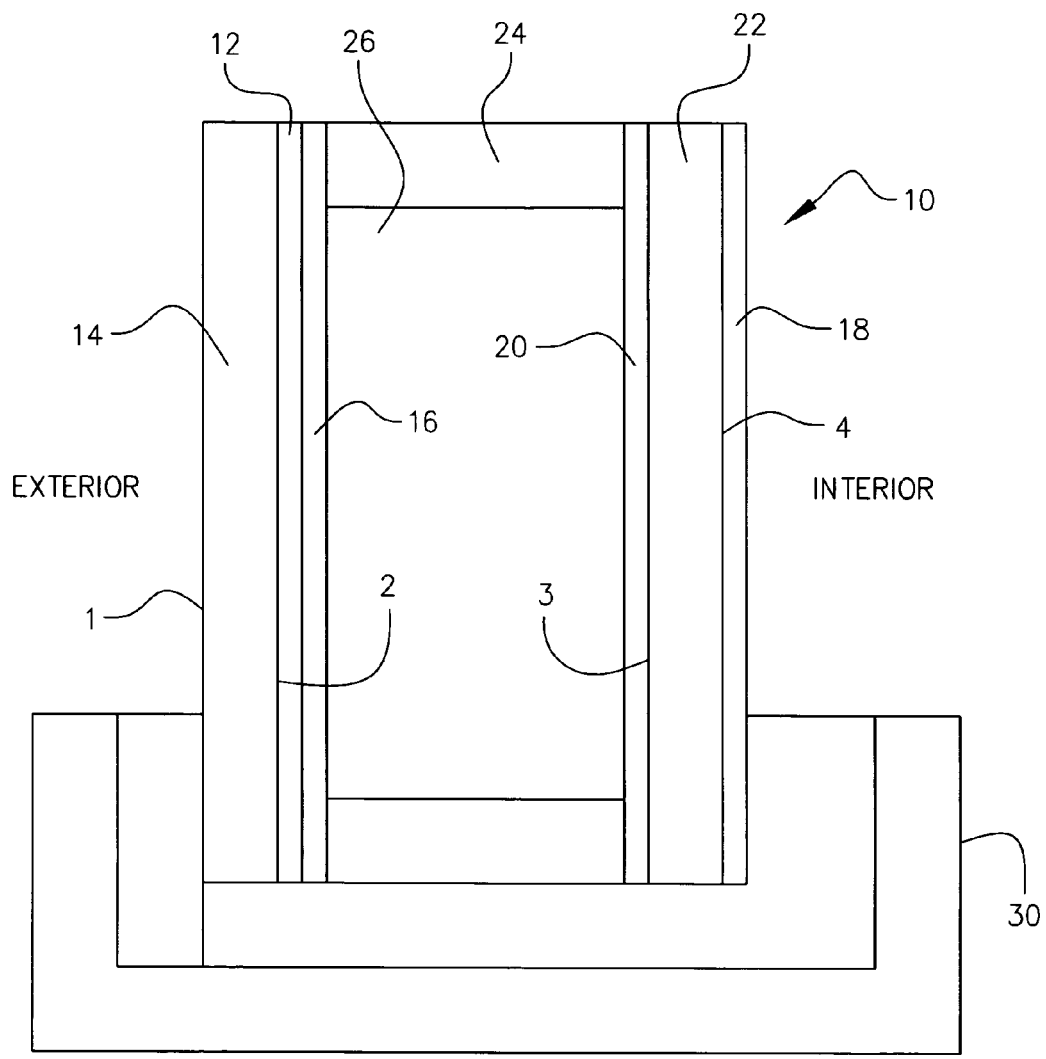
FIG. 1 is a side elevational view of an insulated glass window of this invention mounted in a window frame.
Figure 2:
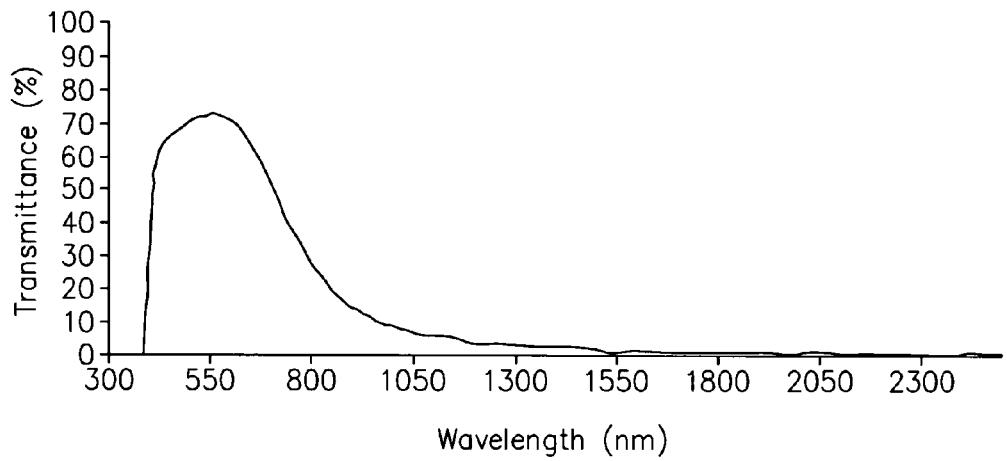
FIG. 2 is a transmission spectrum of a glass pane on which is applied a solar control layer and a low-E layer on one surface.
Figure 3:
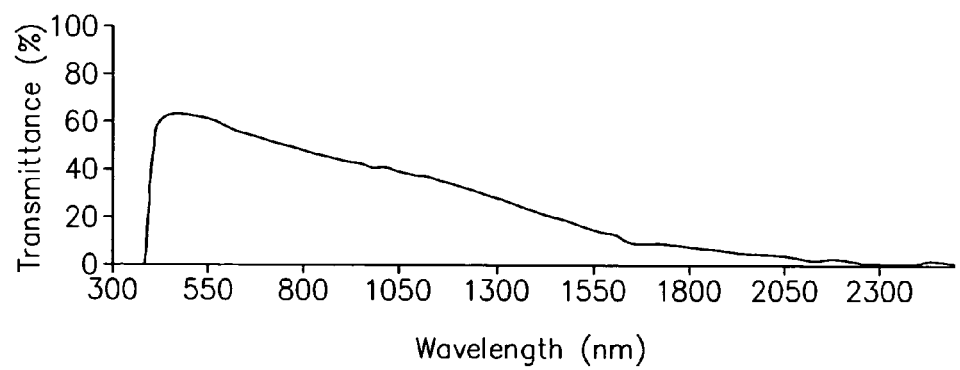
FIG. 3 is a transmission spectrum of a glass pane on which is applied an alternate antimony based solar control and low-E coating.

Referring to FIG. 1, a solar control coating 12 is coated on the inside surface 2 of the first glass pane 14. The coating can be made either by sputtering deposition or chemical deposition method. A sputtered coating, as used in FIG. 2, has silver or other IR reflective metal layers sandwiched by metal oxide layers. This coating reflects more infrared rays than it absorbs. The metal composite provides the window glass with high visible light transmission and low visible light reflection as well as low-E properties. As a result, it is an ideal heat mirror product. The chemical vapor deposition coating has better chemical and scratch resistance than the sputtering coated product. It will absorb solar energy instead of reflect it. As a result, it builds a heat stress over the glass pane and could cause glass breakage. Another disadvantage is that it has a lower visible light transmission than sputtering coated glass to achieve the similar solar performance. The transmission spectra for the preferred solar control coatings are shown in FIG. 2 and FIG. 3. The most preferred solar control coating sold by Pittsburg Plate Glass Co. is shown in FIG. 2. A safety film 16 is laminated over the sputtered coating 12 on surface 2 to re-enforce the glass and also protect the metal from corrosion and other chemical reactions during aging. However, once laminated with a safety film, it destroys or significantly reduces the low-E property.

A safety film 16 is constructed with three layers of clear PET film laminated to each other with a pressure sensitive adhesive. The safety film has a thickness of 0.004 to 0.025 inches. The preferred thickness is 0.008 to 0.018 inches and most preferred is a film thickness of 0.015 inches. The adhesive is an acrylic based pressure sensitive type. The coat weight of the mounting adhesive, which bonds the safety film to the glass, is between 12-17 lb/ream. The multi-layered construction is better than a single layer PET film because it improves the film's impact resistance. More layers are better for impact resistance but the multi-layered laminating construction can cause distortion problem.

To meet the low-E requirement, a low-E coated glass film 18 has to be used. The function of the low-E coating 18 is to reflect the mid-range infrared rays and reduce the heat flux through the window glass. The coating faces the inside of the room on glass surface 4 as shown in FIG. 1. The preferred low-E coating is chemical deposited over the glass. The E value is 0.03-0.25. The preferred E value is 0.08-0.20. The most preferred E value is 0.17 or lower. The visible light transmission (VLT) of the low-E glass is 35-90%. The preferred VLT is 60-85%. The most preferred VLT is 80%. The preferred color is neutral or light green. A safety film 20 is laminated on the interior surface 3 of glass 22 to re-enforce the interior glass.

The coated window glass 14 or 22 can be any type, such as annealed, heat strengthened or tempered.

EXAMPLE 1

The exterior glass pane 14 uses PPG's SB60 CL-3 sputtered solar control low-E glass. The dimension is 2.5"×5"×⅛". The glass has a visible light transmission (VLT) of 75.9%. The VLT is measured with a Densitometer made by Gretag Macbeth Company. The emissivity reading (E value) is 0.05. The data is obtained through an Emissometer manufactured by Devices & Service Company. The color is light yellow green with a reading of $a^*=-2.19$, $b^*=2.04$, and $L=90.79$. Where $a^*$ is CIELAB color space coordinate defining the red/green axis; $b^*$ is CIELAB color space coordinate defining the yellow/blue axis; and L is CIELAB color space coordinate defining the lightness axis. The color numbers are measured with a Spectrogard made by BYK Gardner Company. The transmission spectrum of the coated glass is measured by Lambda 900 UV/VIS/NIR spectrometer manufactured by Perkin Elmer Company. The spectrum is shown in FIG. 2.

Figure 4:
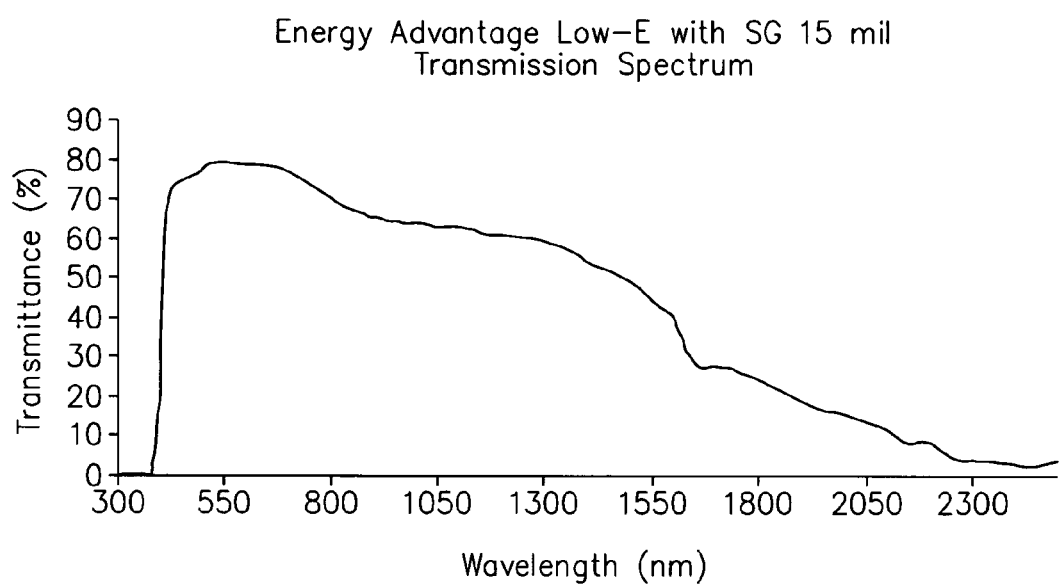
FIG. 4 is a transmission spectrum of a glass pane on which is applied a low-E coating.

The interior glass pane 22 uses Pilkington North America, Inc., Energy Advantage Low-E glass. It is coated on surface 4 through a chemical vapor deposition method. The dimension is the same as the exterior glass pane. The glass has a VLT reading of 79%. The emissivity reading is 0.18. The color is light neutral and yellow, $a^*=-0.91$, $b^*=1.83$, and $L=92.50$. The transmission spectrum of the low-E glass is shown in FIG. 4.

A 15 mil safety film is constructed with three layers of 5 mil clear PET film laminated to each other with an acrylic pressure sensitive adhesive. The coat weight for the laminating adhesive is 11 lb/ream. A mounting adhesive is used to bond the 15 mil safety film and glass together. The mounting adhesive chooses the same adhesive as the laminating adhesive but has a higher coat weight. It is about 16 lb/ream. A UV absorber is added into the adhesive formulation to eliminate UV spectrum from the sun.

An insulating glass unit 10 (IG unit) as shown in FIG. 1 is constructed in the way described as follows. A safety film 16 is laminated to the solar control coated surface 12 of the exterior glass 14 through a laminator. A clean room environment is required. A second safety film 20 is laminated to the non-coated surface of the interior glass 22. A spacer 24 is positioned to the four edges of the first glass pane 14 over the safety film 16. The second glass pane 22 is over lapped to the first pane with safety film 20 facing the safety film 16 on the inside surface of the first glass 14. The four edges are sealed with an appropriate sealant such as buytal or silicone sealants. The IG unit is filled with argon gas 26 to improve insulation. The final construction as shown in FIG. 1 is that solar control coating 12 is on the inside surface 2 of the exterior glass 14 and the low-E coating 18 is on the exterior surface 4 of glass 22 facing the inside of a room. The safety films 16 and 20 are on the inside surfaces 2 and 3 respectively, of glass 14 and 22. The insulating performance data is calculated as follows:

Both the exterior solar control glass pane 12 and interior low-E glass pane 22 are laminated with a 15 mil safety film on surfaces 2 and 3 respectively, and tested with a Perkin Elmer's Lambda 900 uv/vis/nir spectrometer. The emissivity number is measured with a digital voltmeter. The data are input into a Window 5.0 program for analyzing window thermal performance. The software is developed by Lawrence Berkeley National Laboratory. The results are listed in table 1. The U-value is the amount of conductive heat energy transferred through one square foot of a specific glazing system for each 1° F. temperature difference between the indoor and outdoor air. The lower the U-value, the better insulating qualities of the glazing system. Solar Heat Gain Coefficient (SHGC) is measurement of the percentage of solar energy that is either directly transmitted or absorbed and then re-radiated into a building. The lower the coefficient, the better the window is able to reduce solar heat.

A scratch resistance test is conducted with Taber 5130 Abraser. The test follows the ASTM D 1003 method. After 100 cycle abrasion, the delta haze for the low-E coating on the Pilkington North America, Inc., Energy Advantage low-E glass is 0.34%. The haze is measured with BYK Gardner's Haze Gard Plus meter.

EXAMPLE 2

Exterior glass pane 14 uses Pilkington North America, Inc., Solar E glass. The dimension is 2.5"×5"×⅛". The glass has a visible light transmission of 60.3%. The emissivity reading is 0.20. The color is blue, a*=−2.18, b*=−2.58, L=82.40. The glass has a transmission spectrum shown in FIG. 3.

The interior glass 22 uses Pilkington North America, Inc., Energy Advantage Low-E glass. Following the same process as set forth for Example 1, an IG unit is made and tested. The U-value and SHGC reading are listed in table 1.

EXAMPLE 3

Exterior glass pane 14 uses PPG's SB60 CL-3 sputtered solar control low-E glass. The interior glass 22 uses Pilkington's Solar E glass. Following the same process as set forth for Example 1, an IG unit is made and tested. The U-value and SHGC reading are listed in Table 1.

A scratch resistance test is conducted in the same manner as described in Example 1. After 100 cycles of abrasion testing, the solar control low-E coating is removed. The glass is clear and has less haze. The delta haze is −0.60%.

EXAMPLE 4

Both exterior 14 and interior 22 glass panes are clear glass. The dimension is the same as described in Example 1. A 17 mil safety and solar control low-E film is constructed in a way that a 2-mil sputtering coated solar control low-E film is laminated onto the 15 mil safety film with metal surface exposed. The laminating adhesive is the same acrylic pressure sensitive adhesive as previously described.

An IG unit is constructed in the same way as described in Example 1. The only difference is that the 17 mil safety and solar control low-E film is laminated on the inside surface of glass 14, and the 15 mil safety film is laminated on the inside of glass 22. Both exterior 14 and interior 22 glass panes are clear glass. The U-value and SHGC are described in Table 1.

EXAMPLE 5

Both exterior 14 and interior 22 glass panes use PPG's SB60CL-3 solar control low-E glass. An impact resistance IG unit is built the same way as described in Example 1. The only difference is that the interior glass 22 has the sputtering coated solar control and low-E coating. The U-value and SHGC are measured in Table 1. The energy performance is very good but corrosion has been found in the lab sample on a surface.

EXAMPLE 6

Exterior glass 14 uses PPG's SB60CL-3 and interior 22 glass uses a clear glass. A safety film is laminated on the inside surfaces of glass 14 and 22. The U-value and SHGC are measured and listed in Table 1. The data shows that the glass's E value is significantly weakened.

EXAMPLE 7

Weathering Test

A safety film is laminated over PPG's SB60CL-3 coating. The glass pane is tested in a QUV chamber for accelerated weathering. The glass side faces the UV lamp. The testing follows ASTM G154 methods. After 5,500 hours of exposure no corrosion or chemical reaction between the adhesive and sputtered metal is found. The glass VLT and E-value has not changed. However, the corrosion was found in the uncovered area of the low-E glass. The mounting adhesive is found slightly yellow after UV exposure.

Corrosion Test

Both Energy Advantage Low-E and Solar E glass panes are placed in a bucket filled with a little water. The bucket is placed in a 135° F. hot room for 14 days. No corrosion is found. Both the glasses have very good corrosion and chemical resistance. They are made through a chemical vapor deposition process.

TABLE 1

IG unit energy performance data in the center of the glass:

| No. | IG unit construction | Total VLT % | U-value | SHGC |
|---|---|---|---|---|
| Government requirements | Energy Star Criteria | | ≦0.35 | ≦0.40 |
| Example 1 | Glass/sb60cl-3/SG15 mil/Ar/SG15 mil/glass/EA-low E | 50.1 | 0.34 | 0.32 |
| Example 2 | Glass/solar E/SG15 mil/Ar/SG15 mil/glass/EA-low E | 41.7 | 0.34 | 0.40 |
| Example 3 | Glass/sb60cl-3/SG15 mil/Ar/SG15 mil/glass/solar E | 37.2 | 0.35 | 0.28 |
| Example 4 | Glass/17 mil solar E/Ar/SG 15 mil/glass | 58.9 | 0.26 | 0.35 |
| Example 5 | SB60cl-3 glass/SG15 Mil/Ar/SG15 mil/sb60cl-3 Glass | 56.5 | 0.31 | 0.30 |
| Example 6 | SB60cl-3 glass/SG15 Mil/Ar/SG15 mil/glass | 62.9 | 0.46 | 0.35 |

The above description has described specific steps and materials to form an insulated high impact resistant composite mounted in a window frame. However, it will be within the knowledge of one having ordinary skill in the art to make modifications without departing from the way and scope of the underlying inventive steps to obtain the same results. The inventive function for the steps employed are not limited to the materials employed but include modifications and equivalent materials as would normally be employed.

Having thus described the invention, what is claimed and desired to be secured by Letters Patent is:

1. A method of forming an insulated impact-resistant composite, the steps comprising;
    coating an inside surface of a first glass pane with a solar control coating;
    laminating a first safety film over the coating, the first safety film extending to all edges of the first glass pane;
    coating an outside surface of a second glass pane with a low-E coating;
    laminating a second safety film on an inside surface of the second glass pane;
    facing the first and second safety films of the first and second glass panes towards each other while inserting a spacer between the first glass pane and the second glass pane; and
    backfilling a structural adhesive from an outboard edge of the spacer to the safety film side of the first and second glass panes to form a two glass pane composite while filling with an inert gas.

2. The method according to claim 1, wherein the solar control coating applied to the first glass pane is applied by a sputtering process or a chemical vapor deposition process.

3. The method according to claim 1, wherein the low-E coating on the second glass pane is applied by a chemical vapor deposition process, the emissivity reading being between 0.03-0.30.

4. The method according to claim 3, wherein the process provides a visible light transmission of the low-E coated glass between 35-91%.

5. The method according to claim 1, wherein the laminated first and second safety films are provided as polyethylene terphthalate films.

6. The method according to claim 5, wherein the polyethylene terephthalate films are provided in multi-layers, the safety film having a thickness from 0.004 to 0.025 inches.

7. The method according to claim 6, wherein an acrylic based pressure sensitive adhesive is applied between the film layers.

8. The method according to claim 6, wherein the safety film is provided at a thickness of 0.008 to 0.018 inches.

9. The method according to claim 8, wherein the safety film is provided at a thickness of about 0.015 inches.

10. A method of forming an insulated impact-resistant composite for use in a window frame, the steps comprising:
coating an inside surface of a first window pane with a predetermined thickness of a solar control coating;
laminating a first safety film over the coating, the first safety film extending to all edges of the first window pane;
coating an outside surface of a second window pane with a predetermined thickness of low-E coating;
laminating a second safety film on a reverse surface of the second window pane;
facing the safety film of the first and second window panes towards each other while inserting a spacer between the first and second window panes; and
backfilling a structural adhesive from an outboard edge of the spacer to the safety film side of the first and second window panes to form a two window pane composite while filling with an inert gas.

11. The method according to claim 10, wherein the safety films are applied with an acrylic based pressure sensitive adhesive.

12. The method according to claim 10, wherein the low-E coating on the second window pane is applied by a vapor deposition process.

13. The method according to claim 10, wherein the solar control coating applied on the first window pane is applied by a sputtering process or chemical vapor deposition process.

14. The method according to claim 10, wherein the two window pane composite is mounted in a window frame.

15. The method according to claim 10, wherein the laminated first and second safety films are provided as polyethylene terephthalate films.

16. The method according to claim 15, wherein the polyethylene terephthalate films are provided in multi-layers having a thickness from 0.004 to 0.025 inches.

* * * * *